(12) United States Patent
Weng et al.

(10) Patent No.: US 10,813,211 B2
(45) Date of Patent: Oct. 20, 2020

(54) PRINTED CIRCUIT BOARD LAYOUT FOR MITIGATING NEAR-END CROSSTALK

(71) Applicant: Dell Products L.P., Round Rock, TX (US)

(72) Inventors: Pei-Yang Weng, Chiayi County (TW); Chun-Lin Liao, Taipei (TW); Bhyrav Murthy Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/221,078

(22) Filed: Dec. 14, 2018

(65) Prior Publication Data

US 2020/0196437 A1 Jun. 18, 2020

(51) Int. Cl.
*H05K 1/02* (2006.01)
*H05K 3/00* (2006.01)
*G06F 30/392* (2020.01)
*G06F 30/394* (2020.01)
(Continued)

(52) U.S. Cl.
CPC ......... *H05K 1/0228* (2013.01); *G06F 30/392* (2020.01); *G06F 30/394* (2020.01); *G06F 30/398* (2020.01); *H05K 3/0005* (2013.01); *G06F 2119/10* (2020.01)

(58) Field of Classification Search
CPC .... H05K 1/0228; H05K 1/0245; H05K 1/024; H05K 1/0246; H05K 1/0248; H05K 3/0005; H05K 1/0221; H05K 1/025; H05K 1/0253; H05K 1/0227; H05K 2201/0715; H05K 2201/0723; H05K 2201/0191; G06F 17/5072; G06F 17/5077; G06F 17/5081; G06F 2217/82; H01P 3/026; H01P 3/04; H01P 3/08; H01P 3/081; H01P 3/082; (Continued)

(56) References Cited

U.S. PATENT DOCUMENTS

| 6,420,778 B1 * | 7/2002 | Sinyansky | H05K 1/0216 |
| | | | 257/664 |
| 7,609,125 B2 * | 10/2009 | van Quach | H01L 23/66 |
| | | | 333/238 |
| 9,433,081 B1 * | 8/2016 | Xiong | H04L 41/0803 |

(Continued)

*Primary Examiner* — Roshn K Varghese
(74) *Attorney, Agent, or Firm* — Norton Rose Fulbright US LLP

(57) ABSTRACT

Traces on a PCB can be spaced closer together than in conventional layouts, which previously required the pair-to-pair spacing for the high-speed differential stripline signals to be at least 5H if the signals are originating from the same source and 7H when the signals on two pairs of transmission lines in the traces originate from different sources. Traces may be spaced closer together when, for example, a ratio of the core height to the prepreg height of the printed circuit board is approximately equal to one. Traces may be spaced closer together when, for example, a ratio of the trace spacing distance to the core height distance is less than approximately one. By implementing one or both of these design rules, printed circuit board layouts can be designed, and printed circuit boards manufactured from those designs, that have an intra-group spacing between the first pair and the second pair measured at a point at which the first pair is closest to the second pair of less than approximately five times the prepreg height (the limit for previous printed circuit board designs).

17 Claims, 6 Drawing Sheets

(51) Int. Cl.
*G06F 30/398* (2020.01)
*G06F 119/10* (2020.01)

(58) Field of Classification Search
CPC .......... H01P 3/084; H01P 3/085; H01P 3/087; H01P 3/088
See application file for complete search history.

(56) References Cited

U.S. PATENT DOCUMENTS

| | | | |
|---|---|---|---|
| 2004/0144562 A1* | 7/2004 | Ishikawa | H05K 1/025 174/255 |
| 2005/0183883 A1* | 8/2005 | Bois | H05K 1/024 174/255 |
| 2006/0071840 A1* | 4/2006 | Cheng | H01P 3/085 341/155 |
| 2008/0088007 A1* | 4/2008 | Quach | H05K 1/0219 257/691 |
| 2009/0231065 A1* | 9/2009 | Cheng | H01P 3/026 333/238 |
| 2010/0007429 A1* | 1/2010 | Li | H05K 1/0245 333/5 |
| 2013/0162364 A1* | 6/2013 | Lin | H01P 3/08 333/5 |
| 2015/0282300 A1* | 10/2015 | Kagaya | H05K 1/0245 398/135 |
| 2015/0372366 A1* | 12/2015 | Frye | H01P 5/028 333/238 |
| 2016/0380393 A1* | 12/2016 | Wig | H05K 1/0218 439/62 |

\* cited by examiner

PRINTED CIRCUIT BOARD LAYOUT FOR MITIGATING NEAR-END CROSSTALK

FIELD OF THE DISCLOSURE

The instant disclosure relates to information handling systems. More specifically, portions of this disclosure relate to design of printed circuit boards for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include printed circuit boards that interconnect the variety of hardware components contained within the systems. These printed circuit boards include traces, which are conductive pathways between endpoints, that interconnect the hardware components such that they may communicate with each other to coordinate execution of user tasks. With the increasing demand for higher data rates for information handling systems, the current design trend is towards high-speed signaling using multiple parallel transmission lines in the traces of the printed circuit board. As the number of hardware components and amount of information being exchanged between those components increases, the number of traces increases. Even if the printed circuit board sized remained the same, the density of traces within the printed circuit board would increase from the increased number of traces. But, the form factors of information handling systems are also decreasing, further increasing the density of the traces in the printed circuit board. This creates a problem referred to as near-end crosstalk. Crosstalk is the interference of data on one pair of transmission lines from data transmitted through a nearby pair of transmission lines. The amount of crosstalk between traces is generally proportional to the spacing between those traces. Thus, the increasing density of traces exacerbates the crosstalk problem.

With the density of traces in printed circuit boards (PCBs) increasing every generation, crosstalk issues are becoming more and more relevant in PCB designs. Crosstalk degrades signal integrity by inducing jitter on signals and increasing signal bit error rate (BER) at receivers. In high speed PCB designs, crosstalk is usually minimized through rules of thumb. Conventional design rules set the pair-to-pair spacing for the high-speed differential stripline signals to be at least 5H if the signals are originating from the same source. When the signals on two pairs of transmission lines in the traces originate from different sources then conventional design rules specify that the stripline differential pairs are spaced by 7H, wherein H is a thickness of the substrate of the printed circuit board from the trace to the nearest ground plane.

FIG. 1 illustrates a top-down view of a printed circuit board illustrating routing congestion of traces. The printed circuit board (PCB) 100 includes traces 102. The traces provide a conductive path for transmission of signals between components coupled to the PCB 100. In some portions of the PCB 100 traces have sufficient spacing such that signals one on trace do not interfere with signals on another trace, such as a distance 106. However, in some portions of the PCB 100 congestion results in the traces having insufficient spacing, such as a distance 108 between traces 110A-B. This congestion results in noise on the nearby traces that reduces the rate of data that can be transmitted over the trace and/or results in data corruption in the information handling system containing the PCB 100.

The conventional solution to reduce crosstalk is to space differential pairs as far apart as possible. When no additional space is available between traces, more layers are added to the printed circuit board and traces are spaced out vertically in addition to horizontally. However, adding layers to the printed circuit board increases costs, complexity, and size, which are undesirable for information handling systems.

Shortcomings mentioned here are only representative and are included simply to highlight that a need exists for improved electrical components, particularly for trace layouts in printed circuit boards employed in information handling systems. Embodiments described herein address certain shortcomings but not necessarily each and every one described here or known in the art. Furthermore, embodiments described herein may present other benefits than, and be used in other applications than, those of the shortcomings described above.

SUMMARY

Example embodiments of the invention described herein illustrate that crosstalk between traces can be reduced to allow higher density of traces on the motherboard when certain conditions, applied as design rules, are applied to the layout of the traces. Traces on a PCB can be spaced closer together than in conventional layouts, which previously required the pair-to-pair spacing for the high-speed differential stripline signals to be at least 5H if the signals are originating from the same source and 7H when the signals on two pairs of transmission lines in the traces originate from different sources. Traces may be spaced closer together when, for example, a ratio of the core height to the prepreg height of the printed circuit board is approximately equal to one. Traces may be spaced closer together when, for example, a ratio of the trace spacing distance to the core height distance is less than approximately one. By implementing one or both of these design rules, printed circuit board layouts can be designed, and printed circuit boards manufactured from those designs, that have an intra-group spacing between the first pair and the second pair measured at a point at which the first pair is closest to the second pair of less than approximately five times the prepreg height (the limit for previous printed circuit board designs). Additionally or alternatively, implementation of one or both of these design rules may allow design of circuit board layouts, and manufacturing of printed circuit boards, having an intergroup spacing between the first pair and a third pair of parallel transmission lines originating at a different source as the first pair measured at a point at which the first pair is closest to the second pair of less than approximately seven times the prepreg height (the limit for previous printed circuit board designs).

A method of generating a design for a printed circuit board (PCB) may include receiving endpoints for a plurality of a traces of a printed circuit board and generating a layout for the traces on the printed circuit board between endpoints of the traces, wherein the step of generating the layout for the traces results in a ratio of core height to prepreg height being approximately equal to one. The method may be performed by design software stored on a computer readable medium executing on a computer processor to generate a layout file that can be used in manufacturing of the printed circuit board.

A printed circuit board manufactured from a design generated according to embodiments herein may be used in an information handling system to allow the information handling system to have a higher density of traces, which allows more features and smaller form factors for the information handling system. An information handling system may include a printed circuit board supporting a plurality of integrated circuits, wherein the printed circuit board comprises a plurality of traces, wherein the plurality of traces comprises a first pair of parallel transmission lines located on a geometrical plane within the printed circuit board, wherein the first pair of parallel transmission lines is characterized by a core height distance from the geometrical plane to a first ground on a first side of the printed circuit board from the geometrical plane and is characterized by a prepreg height distance from the geometrical plane to a second ground on a second side of the printed circuit board opposite from the first side from the geometrical plane, and wherein a ratio of the core height to the prepreg height is approximately equal to one.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Some of the hardware components are coupled together through traces on a printed circuit board (PCB). Some of the traces provide high-speed serial communications links to allow transmission of data between components to allow coordinated execution of tasks within the information handling system. For example, some of the traces provide peripheral component interconnect express (PCIe) channels for communication between hardware components such as memory, processors, video cards, networking interfaces, storage devices, and the like. The ends of the trace on the printed circuit board, such as at a source or destination, is an endpoint. Some traces may have multiple source or destinations and thus more than two sets of endpoints. Embodiments of the invention using the PCB layouts include 15G p-cards and planars for PCIe Gen4, ESM and SAS interfaces. In the routing of traces for PCIe channels, use of PCB layouts generated according to design rules described herein result in a reduction of crosstalk by as much as 15% or more and allow the manufacturing of PCBs with higher density of traces.

Figure 1:
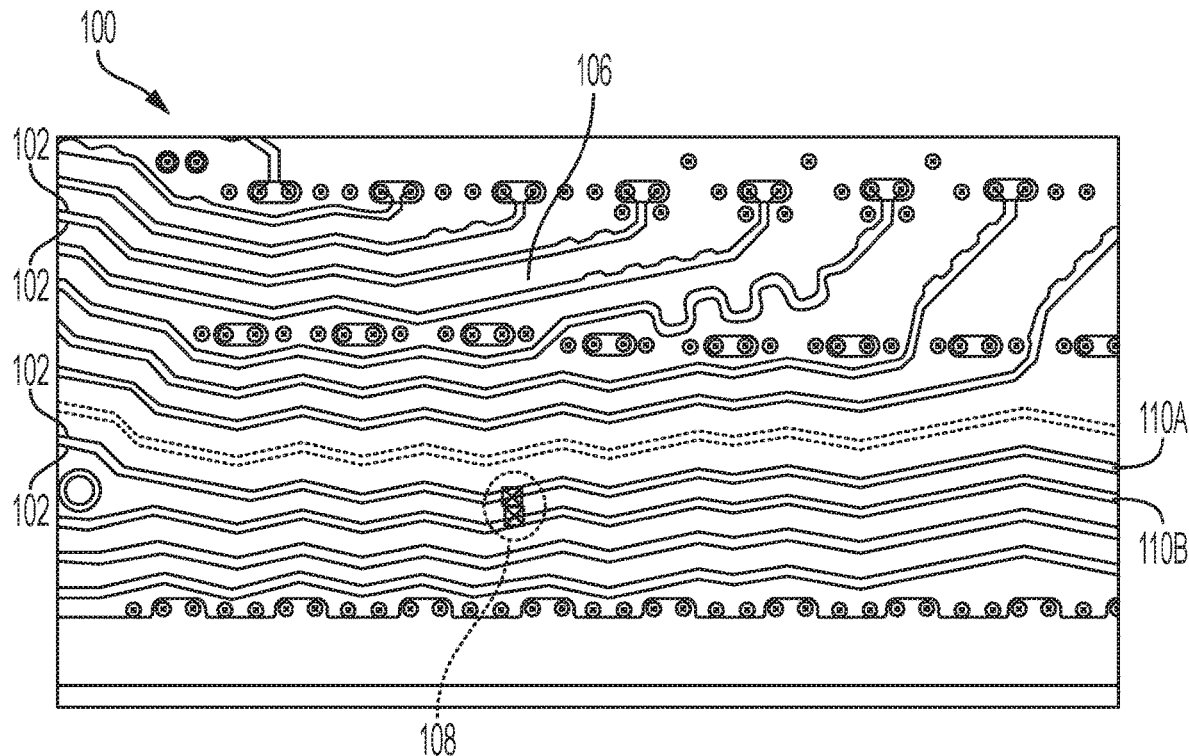
FIG. 1 illustrates a top-down view of a printed circuit board illustrating routing congestion.
Figure 2:
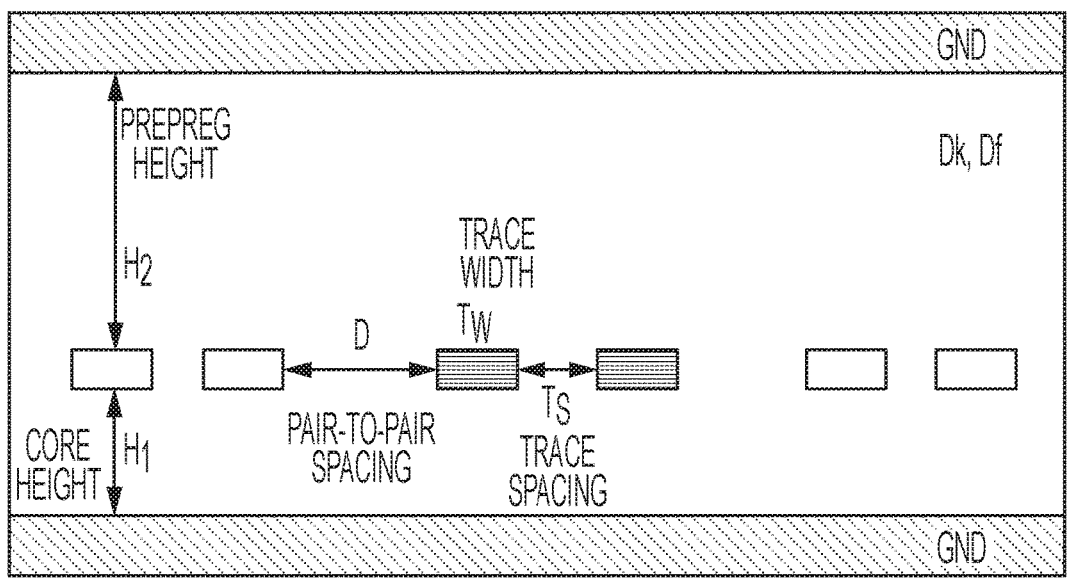
FIG. 2 illustrates a cross-section of a printed circuit board (PCB) with some of the variables illustrated.

There are a lot of variables in the layout of a PCB cross-section and each variable impacts electrical characteristics such as impedance, attenuation, and crosstalk. FIG. 2 illustrates a cross-section of a PCB with some of the variables illustrated. Some variables for PCB design are mechanical variables. For example, H1 is a core thickness, H2 is a prepreg thickness, D is a pair-pair spacing, Tw is a trace width, and Ts is a trace spacing. Some variables for PCB design are electrical variables. For example, Dk is a dielectric constant of the substrate material of the PCB, and Df is a loss tangent of the substrate material of the PCB. Conventionally, the distance from one differential pair to another is considered the variable of control for reducing crosstalk by increasing the distance between pairs. However, additional variables can be optimized to provide for reduced crosstalk while also decreasing the distance between pairs beyond a distance that would normally result in unacceptable crosstalk. There are millions of possible values for the various parameters to generate a PCB layout for traces. Embodiments of the invention described herein provide for a significant reduction of the number of possible values to iterate through when generating a PCB layout.

Figure 3:
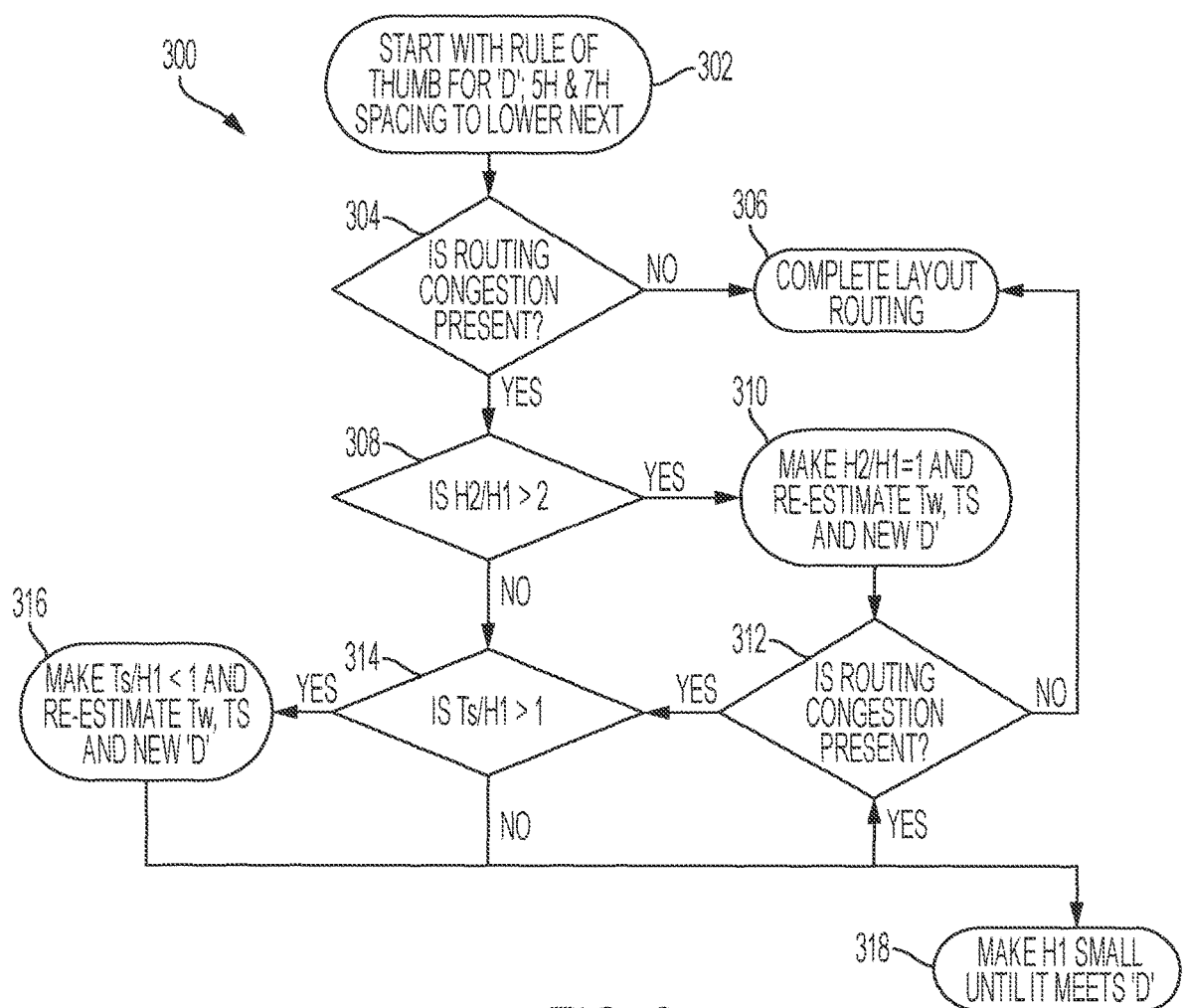
FIG. 3 is a flow chart of an example method for generating a layout for the traces on a printed circuit board (PCB) according to some embodiments of the disclosure.

A new design technique for laying out traces in a printed circuit board considering the use of these additional variables in reducing crosstalk is shown in FIG. 3. FIG. 3 is a flow chart of an example method for generating a layout for the traces on a printed circuit board (PCB) according to some embodiments of the disclosure. A method 300 may begin at block 302 with generating an initial layout according to conventional design rules regarding the spacing of traces, such as desiring 5H and 7H spacing for traces as described above. The layout may be generated to satisfy a received list of a plurality of endpoints by generating a layout specifying paths for traces across the PCB between the endpoints. The traces may be organized as pairs of parallel transmission lines located on a same geometrical plane within the PCB, such as how the traces are organized in FIG. 2.

The initial design may be generated based on certain design rules. A first design rule for block 302 may specify that an intra-group spacing between the first pair and a second pair of parallel transmission lines originating at a same source as the first pair measured at a point at which the first pair is closest to the second pair is greater than approximately five times the prepreg height. A second design rule for block 302 may specify that an inter-group spacing between the first pair and a third pair of parallel transmission lines originating at a different source as the first pair measured at a point at which the first pair is closest to the second pair is less than approximately seven times the prepreg height. At block 304 it is determined whether the initial layout has routing congestion, indicated by unacceptable crosstalk interference between traces of the PCB. Unacceptable crosstalk may be indicated by interference that causes a reduction of signaling on the traces below a data rate specified or desired from the traces. For example, if the interference requires a decrease in data rate from 25 GBps to 16 GBps to maintain signal integrity when the link is needed to operate at 20 GBps, then routing congestion has occurred. When routing congestion is not determined to be a problem at block 304, then the layout routing may be completed at block 306.

When routing congestion is identified at block 304, the method 300 for generating a layout may proceed to block 308 to determine whether a ratio of H2 to H1 for the generated layout of block 302 is greater than approximately two. If the ratio is greater than two then it can be determined that the generated layout can be improved by adjusting the variables H2 and H1 to obtain a ratio of less than two. The unexpected benefits of this ratio are explained in detail below. When the ratio is greater than two, the method 300 continues to block 310 to set the variables H2 and H1 such that the ratio is approximately one, such as between 0.5-1.5 or between 0.75-1.25, and the layout is revised by choosing new values for variables H2, H1, Tw, Ts, and D with a third design rule specifying that the ratio of H2 to H1 is fixed at the selected ratio value. The layout generation may iterate through various combinations of values for Tw, Ts, and D to obtain a desired solution with the set H2 and H1 ratio. After revising the layout at block 310, it is again determined if routing congestion exists at block 312. If routing congestion no longer exists, then the method 300 continues to block 306 to complete layout routing for the PCB. If routing congestion is identified at block 312 or the H2/H1 ratio is not greater than two for the initial design at block 308, then the method 300 continues to block 314.

At block 314 it is determined whether a ratio of Ts to H1 is greater than approximately one. If the ratio is greater than one then it can be determined that the generated layout can be improved by adjusting the variables Ts and H1 to obtain a ratio of one or less. The unexpected benefits of this ratio are explained in detail below. When the ratio is greater than one, the method 300 continues to block 316 to set a fourth design rule specifying that the ratio of variables Ts to H1 is less than one, and the layout is revised by choosing new values for variables H2, H1, Tw, Ts, and D with a ratio of Ts to H1 fixed to be below one. The layout generation may iterate through various combinations of values for Tw, Ts, and D to obtain a desired solution satisfying the design rule that Ts to H1 is less than one. After generating a new layout at block 316 it is again determined at block 312 if routing congestion exists. If no routing congestion exists at block 312 then the layout routing is completed at block 306.

If routing congestion is still determined at block 312, the method 300 may continue to block 318 to set the H1 value to a smaller value until the H1 value meets D. H1 is the distance from the signal line to its main reference. After the PCB design is complete in that the steps of blocks 302-316 are complete, the H1 value may be adjusted. For example, before step 302, the process can set H1 as 5 mils. If the process of blocks 302-316 cannot find a PCB design which could meet the design requirement for routing congestion, such as measured by crosstalk and circuit layout area, then a smaller H1 value may be set at block 318, such as H1=4 mils and repeat blocks 302-316 to find a PCB design.

Figure 4:
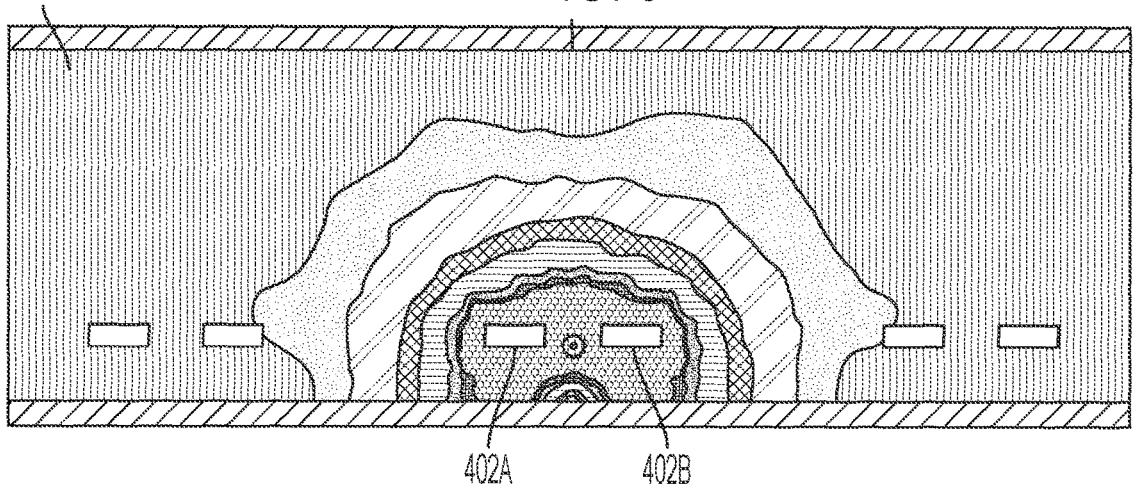
FIG. 4 is a graph of electric field around traces in a printed circuit board (PCB) having an H2/H1 ratio of five that displays the phenomenon of increased crosstalk.
Figure 5:
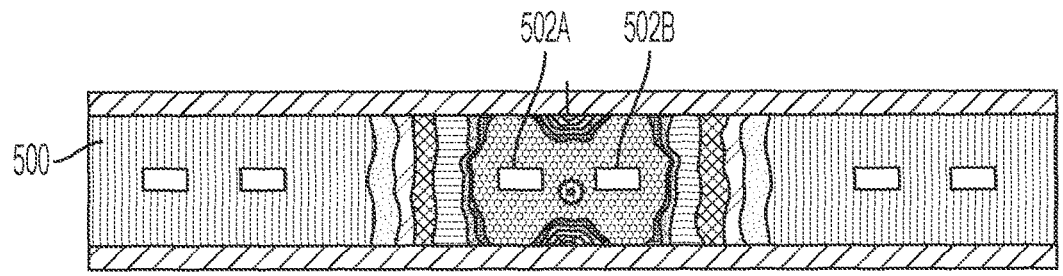
FIG. 5 is a graph of electric field around traces in a printed circuit board (PCB) having an H2/H1 ratio of one according to some embodiments of the disclosure.
Figure 6:
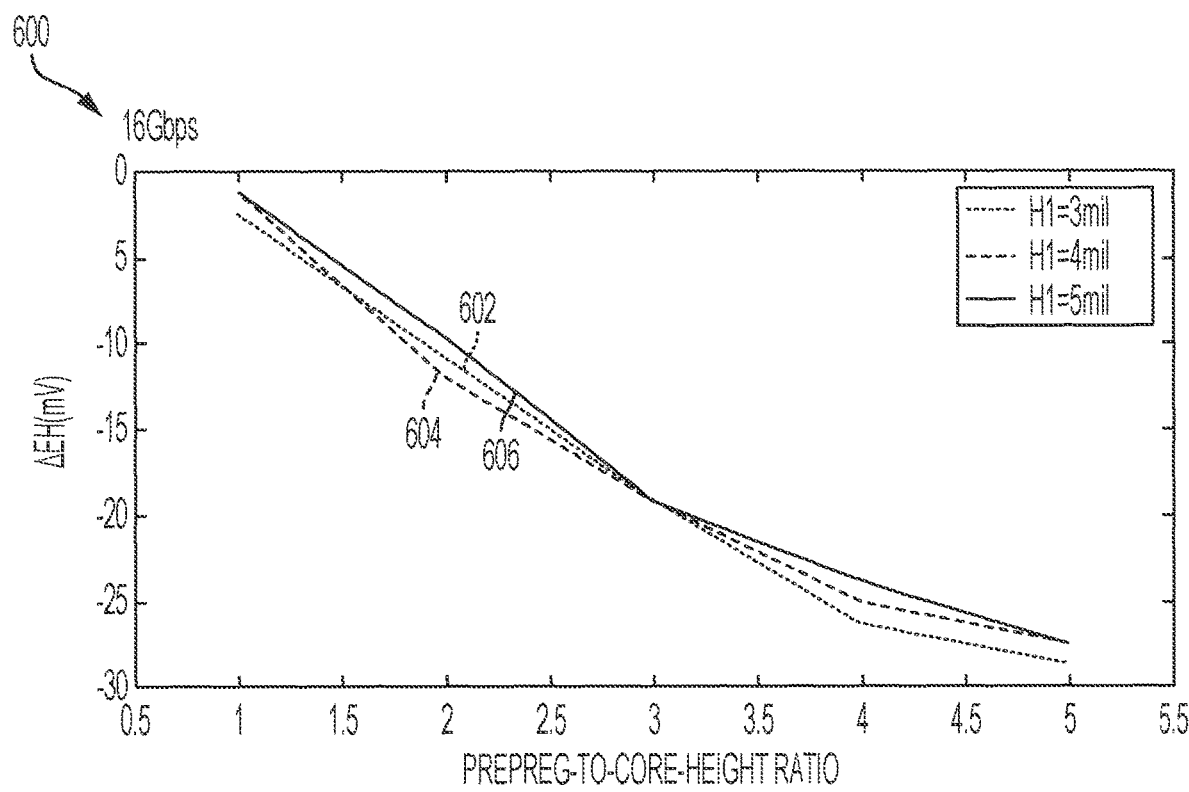
FIG. 6 is a graph illustrating the effect of the H2/H1 ratio for printed circuit boards (PCBs) of various prepreg thickness when operated at a data rate of 16 GBps according to embodiments of the disclosure.
Figure 7:
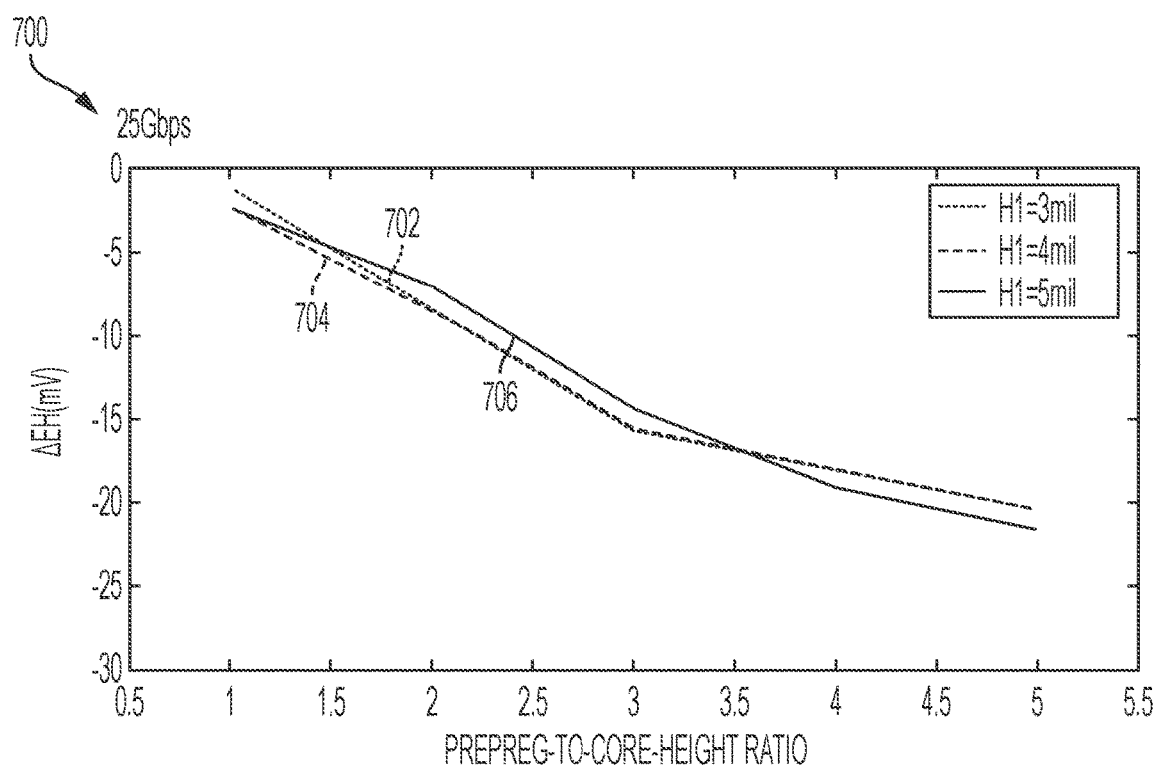
FIG. 7 is a graph illustrating the effect of the H2/H1 ratio for printed circuit boards (PCBs) of various prepreg thickness when operated at a data rate of 25 GBps according to embodiments of the disclosure.

As noted in blocks 308 and 310, a PCB with traces having a ratio of H2 to H1 that is greater than two can be improved by regenerating the design with a design rule specifying that the ratio of H2 to H1 is approximately one. As the stack-up for a PCB becomes asymmetric, crosstalk between differential pairs increases. As the ratio of H2/H1 increases, the crosstalk between the differential pairs increases. FIG. 4 is a graph of electric field around traces 402A-B in a PCB 400v having an H2/H1 ratio of five that displays the phenomenon of increased crosstalk. The graph of FIG. 4 can be compared to the graph of FIG. 5 showing a similar simulation for a PCB layout having a H2/H1 ratio of one. FIG. 5 is a graph of electric field around traces in a PCB having an H2/H1 ratio of one according to some embodiments of the disclosure. The graph of FIG. 5 shows that the fields are much more confined around traces 502A-B in PCB 500 and result in less crosstalk at H2/H1=1 than H2/H1=5. FIG. 6 is a graph illustrating the effect of the H2/H1 ratio for PCBs of various prepreg thickness when operated at a data rate of 16 GBps according to embodiments of the disclosure. Graph 600 includes lines 602, 604, and 606 for H1 heights of 3 mil, 4 mil, and 5 mil, respectively. The lines 602, 604, and 606 illustrate the change in eye height in an eye plot measured for PCB designs with varying H2/H1 ratios when the D/H1 ratio is fixed at three and the Ts/H1 ratio is fixed at two. As shown, the eye height change decreases for lower H2/H1 ratios indicating that interference is decreased as the H2/H1 ratio is decreased. Similar measurements are made for generated PCB layouts operated at a data rate of 25 GBps and shown in FIG. 7. FIG. 7 is a graph illustrating the effect of the H2/H1 ratio for PCBs of various prepreg thickness when operated at a data rate of 25 GBps according to embodiments of the disclosure. Graph 700 includes lines 702, 704, and 706 for PCB layouts with H1 heights of 3 mil, 4 mil, and 5 mil, respectively, with other parameters the same as described with respect to FIG. 6.

Figure 8:
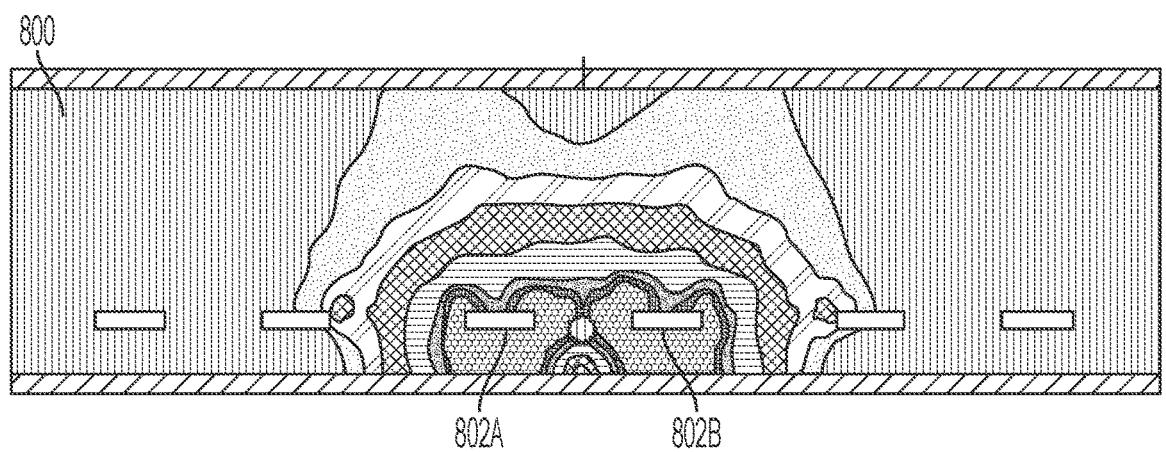
FIG. 8 is a graph of electric field around traces in a printed circuit board (PCB) having a TS/H1 ratio of two that displays the phenomenon of increased crosstalk.
Figure 9:
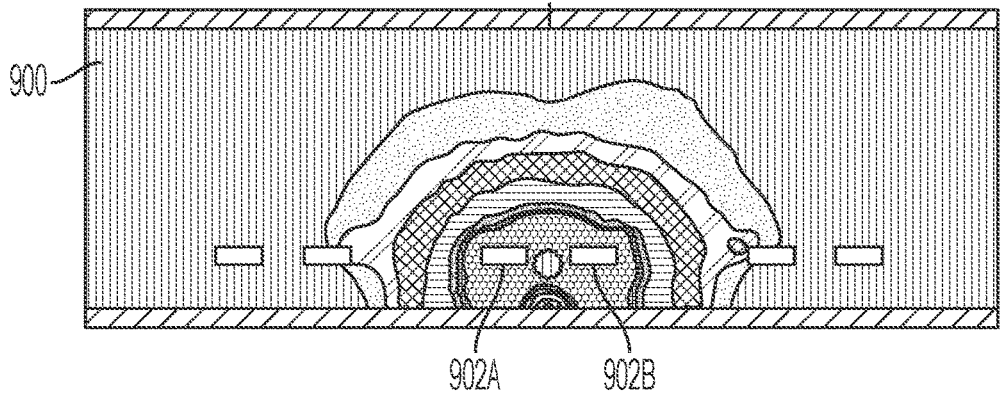
FIG. 9 is a graph of electric field around traces in a printed circuit board (PCB) having a TS/H1 ratio of one according to some embodiments of the disclosure.

As noted in blocks 314 and 316, a PCB with traces having a ratio of TS to H1 that is greater than one can be improved by revising the layout using a design rule specifying that the ratio of TS to H1 is less than one. The ratio of this design rule is desirable because as the ratio of TS/H1 increases, the crosstalk between the differential pairs increases. FIG. 8 is a graph of electric field around traces 802A-B in a PCB 800 having a TS/H1 ratio of two that displays the phenomenon of increased crosstalk. The graph of FIG. 8 can be compared to the graph of FIG. 9 showing a similar electric field simulation for a PCB layout having a TS/H1 ratio of one. FIG. 9 is a graph of electric field around traces 902A-B in a PCB 900 having a TS/H1 ratio of one according to some embodiments of the disclosure. The graph of FIG. 9 shows that the fields are much more confined and result in less crosstalk at TS/H1=1 than TS/H1=2.

Figure 10:
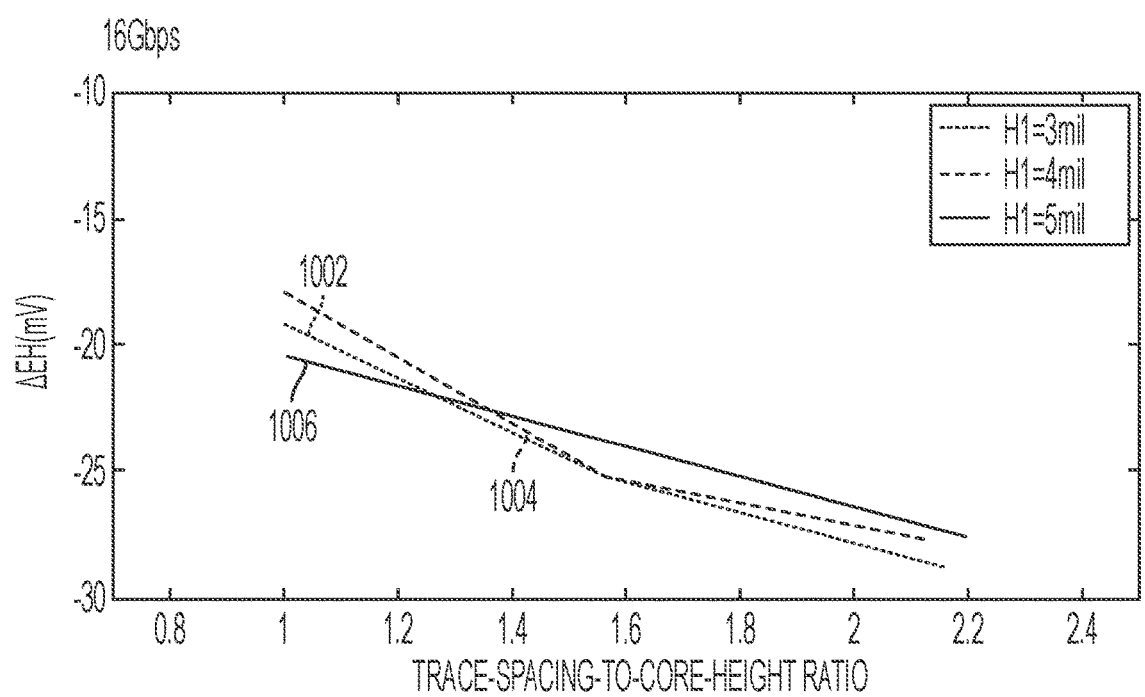
FIG. 10 is a graph illustrating the effect of the TS/H1 ratio for printed circuit boards (PCBs) of various prepreg thickness when operated at a data rate of 16 GBps according to embodiments of the disclosure.

FIG. 10 is a graph illustrating the effect of the TS/H1 ratio for PCBs of various prepreg thickness when operated at a data rate of 16 GBps according to embodiments of the disclosure. Graph 1000 includes lines 1002, 1004, and 1006 for H1 heights of 3 mil, 4 mil, and 5 mil, respectively. The lines 1002, 1004, and 1006 illustrate the change in eye height in an eye plot measured for PCB designs with varying TS/H1 ratios when the D/H1 ratio is fixed at three and the H2/H1 ratio is fixed at five. As shown, the eye height change decreases for lower TS/H1 ratios indicating that interference is decreased as the TS/H1 ratio is decreased. It is possible that Ts/H1 ratio is less than 1.0. However, a smaller TS/H1 ratio will also make the differential pair impedance smaller. If TS/H1 is smaller than 1, it may be difficult to find differential pair structure parameters that meet a common desired impedance, such as 85 ohms or 100 ohms. The TS/H1 ratio of 1 can produce crosstalk immunity that is better than larger TS/H1 ratio.

Figure 11:
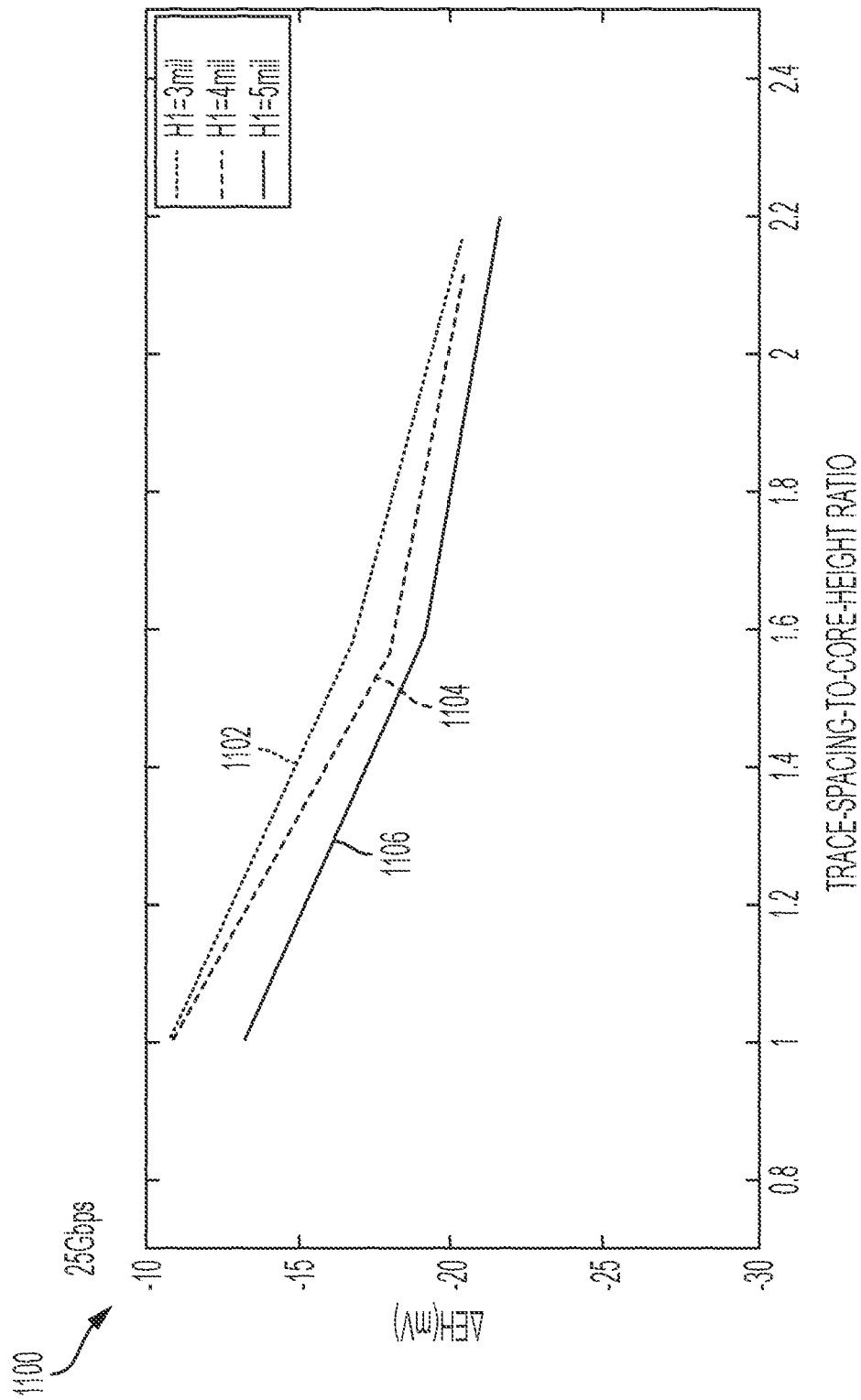
FIG. 11 is a graph illustrating the effect of the TS/H1 ratio for printed circuit boards (PCBs) of various prepreg thickness when operated at a data rate of 25 GBps according to embodiments of the disclosure.

Similar measurements are made for generated PCB layouts operated at a data rate of 25 GBps and shown in FIG. 11. FIG. 11 is a graph illustrating the effect of the TS/H1 ratio for PCBs of various prepreg thickness when operated at a data rate of 25 GBps according to embodiments of the disclosure. Graph 1100 includes lines 1102, 1104, and 1106 for PCB layouts with H1 heights of 3 mil, 4 mil, and 5 mil, respectively, with other parameters the same as described with respect to FIG. 10. In high-speed bus design, the end-to-end channel loss is an important parameter. Conventional designs will try to minimize the end-to-end channel loss. However, using smaller TS/H1 ratio and H2/H1 ratio may increase the channel loss. Thus, conventional knowledge leads a person of ordinary skill from such a design and towards a H2/H1 ratio of larger than or equal to 3.

The schematic flow chart diagram of FIG. 3 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of traces for different kinds of processors, such as graphics processing units (GPUs), central processing units (CPUs), and digital signal processors (DSPs). As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. A method, comprising:
   receiving endpoints for a plurality of a traces of a printed circuit board,
      wherein the traces comprise a first pair of parallel transmission lines located on a geometrical plane within the printed circuit board, and
      wherein the first pair of parallel transmission lines is characterized by a core height distance from the geometrical plane to a first ground on a first side of the printed circuit board from the geometrical plane and is characterized by a prepreg height distance from the geometrical plane to a second ground on a second side of the printed circuit board opposite from the first side from the geometrical plane; and
   generating a layout for the traces on the printed circuit board between endpoints of the traces based, at least in part, on one or more design rules, wherein the one or more design rules comprise a first rule defining a ratio of the core height to the prepreg height of the printed circuit board is approximately equal to one,
      wherein the step of generating the layout for the traces comprises generating an initial layout according to a first design rule such that an intra-group spacing between the first pair and a second pair of parallel transmission lines originating at a same source as the first pair measured at a point at which the first pair is closest to the second pair is greater than approximately five times the prepreg height, and
      wherein the step of generating the initial layout is performed according to a second design rule such that an inter-group spacing between the first pair and a third pair of parallel transmission lines originating at a different source as the first pair measured at a point at which the first pair is closest to the second pair is less than approximately seven times the prepreg height.

2. The method of claim 1, wherein the plurality of traces comprises a second pair of parallel transmission lines originating at a same source as the first pair of parallel transmission lines, wherein an intra-group spacing between the first pair and the second pair measured at a point at which the first pair is closest to the second pair is less than approximately five times the prepreg height.

3. The method of claim 1, wherein the first pair of parallel transmission lines is characterized by a trace spacing distance measured at a point at which a first line of the first pair of transmission lines is closest to a second line of the first pair of transmission lines, and wherein the step of generating the layout for the traces results in a ratio of the trace spacing distance to the core height distance is less than approximately one.

4. The method of claim 1, wherein the step of generating the layout for the traces further comprises:
   determining whether routing congestion exists;
   when routing congestion exists, determining whether the ratio between of the core height to the prepreg height is greater than two; and
   when the ratio between of the core height to the prepreg height is greater than two:
      revising the initial layout by determining new values for a trace width, a trace spacing, and a pair-to-pair spacing using the third design rule.

5. The method of claim 4, wherein the step of generating the layout for the traces further comprises:
   determining whether a ratio between the space tracing and the prepreg height is greater than one; and
   when the ratio between the space tracing and the prepreg height is greater than one:
      setting a fourth design rule setting the ratio between the space tracing and the prepreg height to less than one; and
      revising the initial layout by determining new values for the trace width, the trace spacing, and the pair-to-pair spacing using the fourth design rule.

6. The method of claim 4, wherein the step of revising the initial layout comprises iterating through designs for the traces using new values for the trace width, the trace spacing, and the pair-to-pair spacing to obtain a design that satisfies the third design rule.

7. The method of claim 4, wherein the step of revising the initial layout generates a new design for the traces satisfying the third design rule to reduce crosstalk between the first pair of transmission lines and the second pair of transmission lines.

8. The method of claim 1, wherein the step of generating the layout comprises laying out at least a portion of the plurality of traces to provide PCIe channels.

9. The computer readable medium of claim 1, wherein the step of generating the layout for the traces further comprises:
   determining whether routing congestion exists;

when routing congestion exists, determining whether the ratio between of the core height to the prepreg height is greater than two; and when the ratio between of the core height to the prepreg height is greater than two:
setting a third design rule setting the ratio between of the core height to the prepreg height to approximately one; and
revising the initial layout by determining new values for a trace width, a trace spacing, and a pair-to-pair spacing using the third design rule.

10. The computer readable medium of claim 9, wherein the step of generating the layout for the traces further comprises:
determining whether a ratio between the space tracing and the prepreg height is greater than one; and
when the ratio between the space tracing and the prepreg height is greater than one:
setting a fourth design rule setting the ratio between the space tracing and the prepreg height to less than one; and
revising the initial layout by determining new values for the trace width, the trace spacing, and the pair-to-pair spacing using the fourth design rule.

11. The computer readable medium of claim 9, wherein the step of revising the initial layout comprises iterating through designs for the traces using new values for the trace width, the trace spacing, and the pair-to-pair spacing to obtain a design that satisfies the third design rule.

12. A computer readable medium, comprising:
a non-transitory computer readable medium comprising code to perform the steps of:
receiving endpoints for a plurality of a traces of a printed circuit board,
wherein the traces comprise a first pair of parallel transmission lines located on a geometrical plane within the printed circuit board, and
wherein the first pair of parallel transmission lines is characterized by a core height distance from the geometrical plane to a first ground on a first side of the printed circuit board from the geometrical plane and is characterized by a prepreg height distance from the geometrical plane to a second ground on a second side of the printed circuit board opposite from the first side from the geometrical plane; and
generating a layout for the traces on the printed circuit board between endpoints of the traces based, at least in part, on one or more design rules, wherein the one or more design rules comprise a first rule defining a ratio of the core height to the prepreg height of the printed circuit board is approximately equal to one, wherein the step of generating the layout for the traces results in a ratio of the core height to the prepreg height being approximately equal to one,
wherein the step of generating the layout for the traces comprises generating an initial layout according to a first design rule such that an intra-group spacing between the first pair and a second pair of parallel transmission lines originating at a same source as the first pair measured at a point at which the first pair is closest to the second pair is greater than approximately five times the prepreg height, and wherein the step of generating the initial layout is performed according to a second design rule such that an inter-group spacing between the first pair and a third pair of parallel transmission lines originating at a different source as the first pair measured at a point at which the first pair is closest to the second pair is less than approximately seven times the prepreg height.

13. The computer readable medium of claim 12, wherein the plurality of traces comprises a second pair of parallel transmission lines originating at a same source as the first pair of parallel transmission lines, wherein an intra-group spacing between the first pair and the second pair measured at a point at which the first pair is closest to the second pair is less than approximately five times the prepreg height.

14. The computer readable medium of claim 12, wherein the first pair of parallel transmission lines is characterized by a trace spacing distance measured at a point at which a first line of the first pair of transmission lines is closest to a second line of the first pair of transmission lines, and wherein the step of generating the layout for the traces results in a ratio of the trace spacing distance to the core height distance is less than approximately one.

15. An information handling system, comprising:
a printed circuit board supporting a plurality of integrated circuits, wherein the printed circuit board comprises a plurality of traces, wherein the plurality of traces comprises a first pair of parallel transmission lines located on a geometrical plane within the printed circuit board,
wherein the first pair of parallel transmission lines is characterized by a core height distance from the geometrical plane to a first ground on a first side of the printed circuit board from the geometrical plane and is characterized by a prepreg height distance from the geometrical plane to a second ground on a second side of the printed circuit board opposite from the first side from the geometrical plane, and
wherein a ratio of the core height to the prepreg height is approximately equal to one,
wherein an intra-group spacing between the first pair and a second pair of parallel transmission lines originating at a same source as the first pair measured at a point at which the first pair is closest to the second pair is greater than approximately five times the prepreg height, and
wherein an inter-group spacing between the first pair and a third pair of parallel transmission lines originating at a different source as the first pair measured at a point at which the first pair is closest to the second pair is less than approximately seven times the prepreg height.

16. The information handling system of claim 15, wherein the first pair of parallel transmission lines is characterized by a trace spacing distance measured at a point at which a first line of the first pair of transmission lines is closest to a second line of the first pair of transmission lines, and wherein a ratio of the trace spacing distance to the core height distance is less than approximately one.

17. The information handling system of claim 15, wherein the information handling system comprises a server system, and wherein the plurality of traces comprises PCIe channels.

* * * * *